United States Patent
Lohmeyer

[11] 3,976,357
[45] Aug. 24, 1976

[54] LIGHT CONDUCTOR

[76] Inventor: Hartmut Lohmeyer, Schleissheimer Strasse 189, 8000 Munich 40, Germany

[22] Filed: Feb. 26, 1975

[21] Appl. No.: 553,240

[30] Foreign Application Priority Data
Mar. 4, 1974 Germany............................ 2410288

[52] U.S. Cl. .......................... 350/96 R; 350/96 WG
[51] Int. Cl.² ........................................... G02B 5/14
[58] Field of Search............ 350/96 R, 96 WG, 96 B

[56] References Cited
UNITED STATES PATENTS

| | | | |
|---|---|---|---|
| 3,712,705 | 1/1973 | Marcatili | 350/96 WG |
| 3,813,141 | 5/1974 | Miller | 350/96 R |
| 3,844,752 | 10/1974 | Kaiser | 350/96 WG |
| 3,901,674 | 8/1975 | Strack et al. | 350/96 WG |

*Primary Examiner*—John K. Corbin
*Assistant Examiner*—Stewart Levy
*Attorney, Agent, or Firm*—W. G. Fasse; W. W. Roberts

[57] ABSTRACT

This light or optical conductor is formed as an integral structure, preferably by extrusion, of an optical material such as glass or transparent plastics material. A light conducting core is supported in an envelope by means of lands and ribs arranged and shaped in such a manner that the core and the lands as well as the ribs are surrounded by hollow spaces which are preferably filled with air. The ribs are tapering away from the core toward the envelope whereby light entering into these ribs through the lands from the core is reflected back into the core.

12 Claims, 6 Drawing Figures

LIGHT CONDUCTOR

BACKGROUND OF THE INVENTION

The invention relates to optical conductors, more specifically a light conductor made of a transparent material such as optical glass or transparent plastics, such as methacrylate or polystyrene.

It is known that light may be conducted through rods of glass or other transparent materials. Heretofore, such conductor rods have been manufactured for practical purposes mostly by combining a plurality of so called optical fibers into bundles of larger diameter. The fibers in such a bundle are arranged in such a manner that the position of any individual fiber within the bundle is the same at the beginning and at the end of the respective light conductor. Such light conductors permit the transmission of images whereby the individual image points are transmitted separately in each of the fibers making up the bundle.

The light transmission by means of a rod or of a fiber or a bundle of fibers is possible due to a total reflection. A light ray entering the facing end of such a rod is reflected in zig-zag fashion at the outer surfaces of the rod which face each other. The reflection is repeated until the light ray exits at the opposite end of the rod or bundle. In order to achieve an efficient light transmission, it is rather important that the total reflection is accomplished even for rather small total reflection angles $a_g$. This critical angle of total reflection is important because those light rays the angle of incidence of which is below said critical angle would not be reflected back into the rod or conductor, rather such light beams would penetrate the outer surface of the rod and would thus be lost for the transmission. This critical angle may be calculated from the so called Snellius equation as follows:

$$\sin a_v = n'/n$$

In the foregoing equation $n$ is the refraction index of the material of which the rod is made and $n'$ is the refraction index of the medium surrounding the conductor rod. In order to achieve an efficient light transmission it is necessary that the surrounding medium is optically thinner than the conducting material of the light conductor. In other words, the surrounding medium must have a smaller refraction index than the material of the conductor rod because otherwise there will be no total reflection of the light beams.

For example, if the rod is made of a material having a refraction index of 1.5 and if the conductor rod is surrounded by air having a refraction index of about 1.0, the respective critical angle $a_g$ would correspond to about 42° according to the above equation. However, if the rod of the same material is surrounded by another material having a refraction index of 1.4, the critical angle $a_g$ will increase to about 70°. This means that the angle of incidence of the light onto the outer surfaces of the conductor may be the steeper the larger the difference between the two contiguous media while still assuring the total reflection. This fact becomes even more important when the rod includes curved sections or where the rod or bundle of optical fibers is flexible and has bends therein. The angle of incidence will be steeper in the curved sections of the conductor due to geometrical considerations. Thus, if the bend in the conductor becomes too pronounced, it is possible that light losses may occur. This means, that the light conductor having a large difference between the refraction indices of its two media, may be bend to a larger extent than a conductor where the respective difference between the refraction indices is smaller. Thus, the conductor having the larger difference between the refraction indices of its materials will have smaller light losses.

Incidentally, the total reflection of a light conductor disappears completely at those points at which the outer surfaces of the light conductor are in contact with a medium having a larger refraction index or where the light conductor is in contact with an opaque medium.

As a result of the above considerations, certain problems have arisen in the actual manufacture of light conductors and in the use of such conductors. Since such a glass rod or an optical fiber cannot freely float in space merely surrounded by air, if it is desired to use it as a light conductor, it is necessary that the light conductor is supported by another optical medium which is optically thinner. Such contact with another optical medium cannot be avoided, for example, due to the fact that a plurality of optical fibers are bunched together or that the conductor is arranged in a protective envelope or that it is supported at certain points along its length. The refraction indices or materials so far known to be suitable for light conductors and for envelopes of such conductors are within the range of about 1.4 to 1.6. Accordingly, only small differences between the respective refraction indices may be accomplished.

Further problems result due to the fact that it is desirable to make the light conductors flexible. Where glass is used the flexiblity can be achieved only by reducing the diameter of the individual optical fibers which reudction has its limitations, because the thinner the fiber, the larger is the risk that it will break. Heretofore, the glass fibers have been coated in a rather complicated procedure by a glass having a smaller refraction index than the glass of the fiber itself. The so coated fibers are then bunched and cemented to each other whereupon the entire bundle is provided with a protective envelope. All these steps constitute a rather expensive production process whereby the range of applications of such light conductors is rather limited to certain uses which justify the high production costs.

In view of the above, experiments have been made to produce light conductors from synthetic materials as mentioned above. However, even the use of synthetic materials has not been without problems because the suitable synthetic materials have indices of refraction which are substantially equal to each other. On the other hand, such synthetic materials have quite satisfactory optical characteristics and they also have the necessary flexiblity. Nevertheless, it is difficult to achieve a substantial difference between the index of refraction of the light conductor proper and the respective index of the coating. Attempts to fill a hose of synthetic material having a low index of refraction with a liquid having a higher index of refraction have not been quite satisfactory because even in this type of arrangement the difference between the refraction indices remains rather small. Besides, it is not possible to expose such liquids to larger temperature differentials. However, for practical reasons, it is not possible to avoid exposing light conductors to such temperature differentials. Another disadvantage results from the need that the ends of the light conductor must be closed by plugs or the like, whereby substantial sealing problems are created and additional refraction surfaces are produced. Thus, other attempts have been made to arrange between the light conductor core and a protective envelope a layer of air. The required spacing or distance between the conductor core and the protective envelope should then be limited to spacer means providing a point or line contact between the core and the envelope. A line contact is accomplished, for example, where a triangular light conductor core is inserted into a circular protective envelope. In such an embodiment, the contact between the triangular core and the envelope is limited to the corners or edges of the triangle. However, even such solutions to the problem are not quite satisfactory because each point of contact between the light conductor and the protective envelope completely prevents the total reflection at such point and the resulting light losses accumulate along the length of the conductor.

OBJECTS OF THE INVENTION

In view of the foregoing, it is the aim of the invention to achieve the following objects, singly or in combination:

to avoid the drawbacks of the prior art, more specifically to avoid light losses which have been encountered heretofore in light conductors due to the fact that such conductors must somehow be supported in a protective envelope;

to provide the light conductor with such a shape that its manufacture is greatly facilitated, for example, by the use of simple extrusion techniques;

to shape the support means necessary between the core proper and the protective envelope in such a manner that light rays entering into the support means from the core are reflected back into the core;

to shape the light conductor core and its support means in such a manner that the core and the support means are surrounded by hollow spaces substantially along the entire surfaces of the core and the support means so that these hollow spaces may be filled with air, thereby providing for the desirably large difference between the respective refraction indices; and to provide the core and supporting elements, as well as the envelope with such a shape that all the elements may form an integral structure suitable for simple manufacturing techniques, such as pressure extrusion or injection molding.

SUMMARY OF THE INVENTION

According to the invention there is provided a light conductor having an integral core with a uniform cross-sectional shape throughout its length. Supporting ribs are secured on the one hand to the core by means of lands extending out of the core and on the other hand to the inner surface of the protective envelope. The supporting ribs have walls which taper toward the connection points with the protective envelope. The supporting ribs merge into said lands and thus into the core in such a manner that the core, the lands, and the supporting ribs are supported substantially all around by hollow spaces, which are preferably filled with air. Due to the tapering of the supporting ribs away from the core and toward the protective envelope, any light ray entering into the supporting ribs is intercepted by the surfaces of these ribs and reflected back into the core.

According to the invention, the light conductor which conducts most of the light is supported by ribs which are intentionally made part of the light conducting system, whereby due to the shape of these supporting ribs, it is assured that light rays entering into the ribs are reflected back out of the ribs due to the total reflection inside the ribs so that such light rays are returned into the light conductor core. This arrangement has the advantage that light loss due to the supporting ribs are avoided, and that these ribs are capable of supporting the core in such a manner that the core, as well as the supporting ribs are surrounded by air on all sides. Especially this latter feature has the advantage that the best possible difference between the respective refraction indices of the light conductor and of the surrounding medium is accomplished. The connection points where the supporting ribs are secured to the protective envelope cannot act as points of light loss because due to the particular shape of the supporting ribs, as disclosed herein, the light rays are prevented from even reaching these connecting points.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
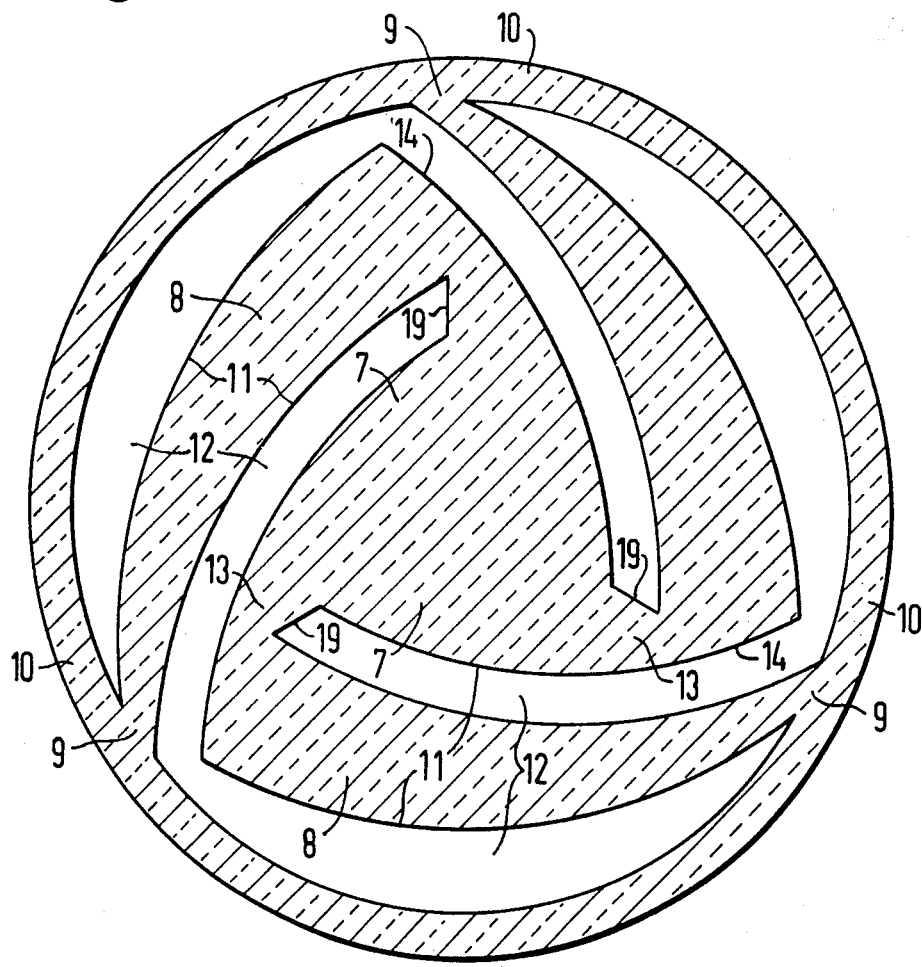
FIG. 1 illustrates a sectional view through a light conductor according to the invention, wherein a core, a plurality of lands and supporting ribs, as well as a protective envelope are formed as an integral structure.

In order to facilitate the illustration, the embodiments of FIGS. 1, 3, 5, and 6 are shown on a substantially enlarged scale. The conductor of FIG. 1 comprises a core 7 which receives the light at one of its ends. The core has substantially the shape of an equilateral triangle, the outer surfaces of which are slightly outwardly curved. The corners of the triangle merge into lands 13 which in turn merge into supporting ribs 8 thus connecting the core 7 to the protective envelope 10. The supporting ribs 8 have walls or rather sides tapering outwardly toward the envelope. The ribs 8 have such facing surfaces 14 that, in combination with said tapering, light entering into the ribs at said facing surfaces will not be able to travel all the way toward the connecting elements 9 between the tips of the ribs 8 and the envelope 10. All the outer surfaces 11 of the ribs 8, of the connecting lands 13, and of the core 7 are surrounded by hollow spaces 12 which are preferably filled with air having a refraction index of 1.0. The connecting elements 9 connect the ends of the supporting ribs 8 to the protective envelope 10 along the entire length of these ribs and the envelope 10 encircles the core 7 with the ribs 8 and the lands 13 all along the conductor. Preferably the envelope 10 is made of the same material as the conductor core 7 and the lands, as well as the ribs. Thus, the envelope will also be transparent. Nevertheless, the envelope does not participate in the light transmission and thus does not impair the efficiency of the light transmission, even if the envelope 10 should be scratched or coated with a coat of paint or lacquer or the like, or even if the envelope 10 comes into contact with other materials. Thus, it will be appreciated that the entire cross section of the light conductor according to the invention including its protective envelope is constructed as an integral element and of the same material, for example, a flexible transparent plastics material or glass. This shape has the substantial advantage that it may be manufactured by injection molding or pressure extruding techniques.

Figure 2:
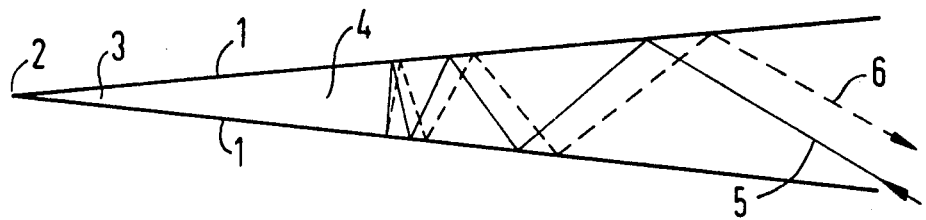
FIG. 2 illustrates the effect of a tapering cross section on a light beam entering into such cross section.

FIG. 2 illustrates the effect of the tapering of the supporting ribs 8, whereby for simplicity's sake the tapering shape is shown as a wedge, rather than in the slightly curved form illustrated in FIG. 1. The effect is the same. It is assumed that a light ray 5 enters the wedge 4 at its facing end 14. As mentioned, the wedge corresponds substantially to the shape of the straight, tapering supporting ribs 8. Further, it is to be taken into account that in FIG. 2 the illustrated light rays are projections of the light rays which in the actual embodiment travel substantially in the longitudinal direction of the light conductor. The reflection angle shown in FIG. 2 will result independently of the direction of advance of the light rays through the longitudinal extension of the light conductor. Thus, also in FIG. 2 the angle of incidence will be equal to the angle of emergence.

As shown in FIG. 2 a light ray 5 which impinges upon an outer surface 1 of the body 4 will be reflected several times, whereupon its advance direction is reversed and the corresponding reflected ray 6 shown by dashed lines emerges again from the body 4. It will be noted, that the ray cannot reach the tip of the body 4 and not even a zone 3 ahead of the tip 2. The same result will be achieved if the outer surfaces of the body 4 are somewhat curved as shown in FIG. 1. In order to make certain that no light ray will reach the tip 2, it is necessary to shape the facing surface 14 of the body 4 in such a manner that no light beam is erected straight toward or substantially straight toward the tip 2. This requirement is fulfilled in the embodiment according to FIG. 1 by providing the lands 13 between the supporting ribs 8 and the core proper. These elements are arranged relative to each other and shaped in such a manner that a light ray entering into the supporting ribs 8 through the lands 13 from the core 7 will quickly impinge upon an outer surface 11 of the respective rib 8 whereby the multiple reflection of the ray is accomplished as described with reference to FIG. 2. As a result, a light ray intercepted so to speak by a supporting rib 8 is returned into the core 7. For this purpose, the shape of the lands 13 is essential. Thus, FIG. 1 shows that the lands 13 taper toward the ribs 8, whereby the width of the lands 13 becomes smaller and smaller as viewed in the direction of the supporting ribs 8. Furthermore, the inclination of the facing surfaces 14 of the ribs 8 assures that light rays which are reflected out of the supporting ribs 8 at a relatively small angle are also returned into the core 7 because the rays may, if necessary be reflected again at the outer surface 19 of the lands 13.

Due to the present teaching for securing and shaping the lands and ribs, it is assured that these elements coact with the core as light conductors with the added advantage that any contact points between the ribs and the protective envelope 10 do not become optically effective due to the above described reflection characteristics of these ribs. Thus, the ribs may safely contact with their tips the envelope at the points 9 without interfering in any manner with the light conduction, whereby the protective envelope 10 does not come into contact with the core 7 nor with any other points along the surfaces of the supporting ribs 8. In this context it should, however, be noted that the light at the input end of the conductor should be supplied only to the core because an uncontrolled light supply directly into the supporting ribs at the input end of the conductor may permit individual light beams to travel toward the tip of the ribs 8, especially where a light beam would travel centrally through the wedge shape straight toward the tip as shown in FIG. 2.

Figure 3:
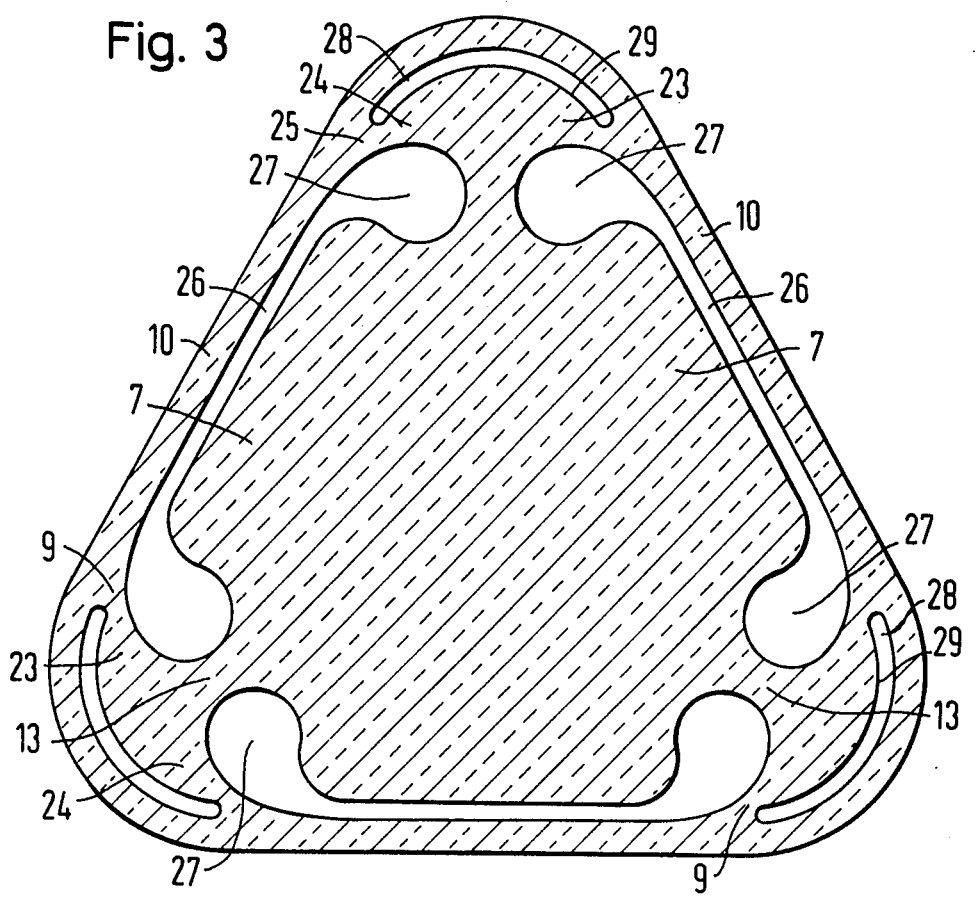
FIG. 3 illustrates a sectional view through a modification of the light conductor shown in FIG. 1.

FIG. 3 illustrates a modified embodiment according to the invention. The lands 13 again merge into the core 7 substantially at the corners of the core. The outer ends of the lands 13 merge each into two supporting ribs 23, 24, which taper outwardly toward respective connecting points 25 between the tips of the ribs 23, 24 and the protective envelope 10. Due to the use of two ribs for each connecting land, the formation of the hollow spaces 26, 27 results in a different configuration as compared to the configuration of the hollow spaces shown in FIG. 1. Thus, in FIG. 3 the side surfaces of the core 7 are spaced from the envelope 10 by narrow hollow spaces 26, which merge into enlarged loop shaped hollow spaces 27 extending along each edge of the narrow hollow space 26. The outwardly facing surfaces of the two ribs 23, 24 are spaced from the envelope 10 by respective curved hollow spaces 28, whereby these curved hollow spaces 28 and the loops 27 cooperate in the formation of the lands 13 and the ribs 23, 24. However, even the somewhat differently shaped configurations of the hollow spaces have the same effect as described above, with reference to FIG. 1.

Figure 4:
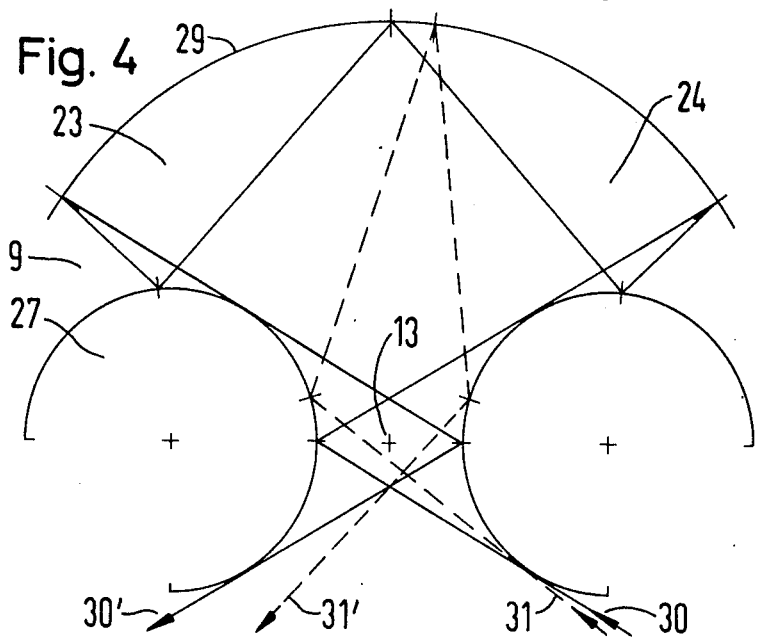
FIG. 4 illustrates the optical effect of the lands and supporting ribs in the embodiment according to FIG. 3.

FIG. 3 schematically illustrates the basic concept of the operation of the lands 13 and the supporting ribs 23, 24 in FIG. 3. A light beams (not shown) extending centrally and symmetrically through the lands 13 intermediate the loops 27 would be directly reflected back into the core 7 by the surface 29 of the ribs 23, 24. FIG. 4 shows a light beam pr ray 30 entering into the lands 13 from the core 7 at a most unfavorable angle of incidence, whereby the light ray 30 is reflected at the surface of the left-hand loop 27 towards the surface 29 in such a manner that it just clears the surface of the right-hand loop 27. The light ray is then reflected by the surface 29 into the surface of the right-hand loop 27 which in turn reflects it to the surface 29 whence the light beam is reflected toward the surface of the left-hand loop 27 causing a further reflection toward the surface 29 whereupon the light beam is again reflected toward the surface of the right-hand loop 27, which returns the light ray 30' into the core 7. In this connection it is not essential that a completely symmetrical arrangement of the elements is employed, as shown in FIG. 4. It is merely necessary that the supporting ribs 23 and 24 are tapered toward the connecting points or elements 25. FIG. 4 further illustrates in dashed lines a light ray 31 emerging from the core 7 at a more favorable angle so that it is reflected only three times to be returned as the ray 31' into the core 7.

Figure 5:
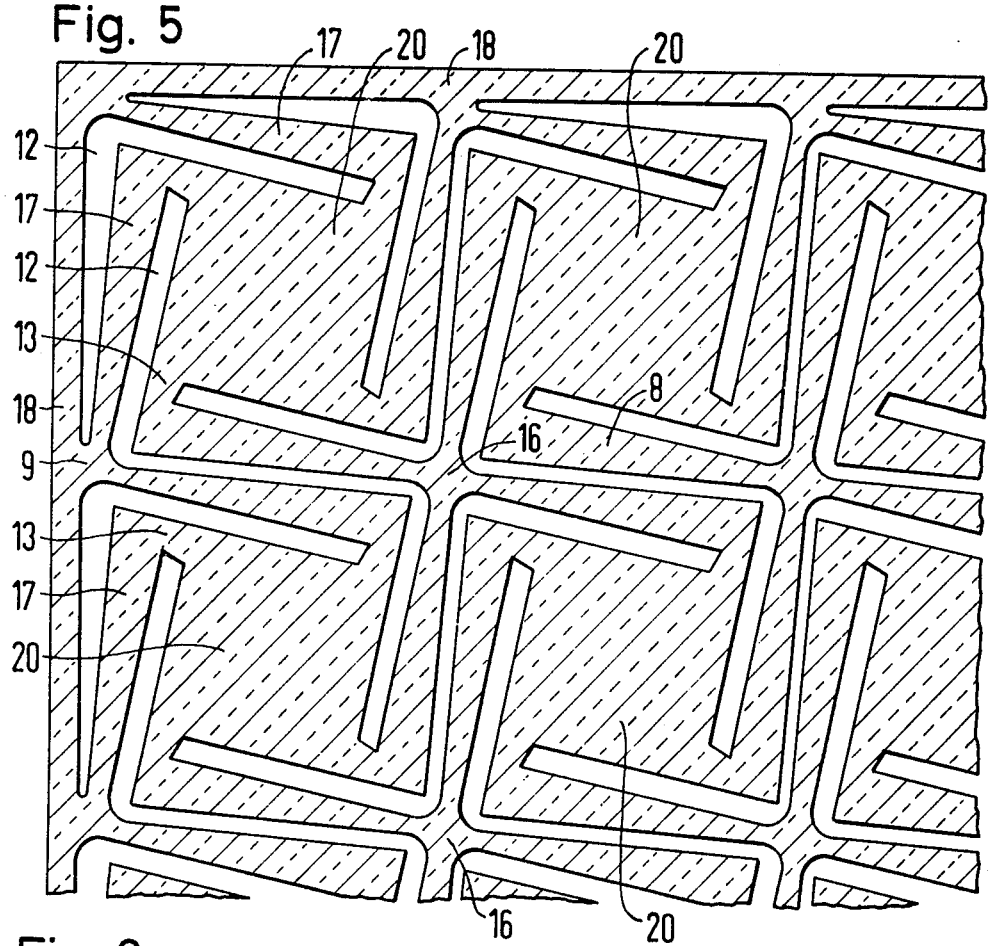
FIG. 5 illustrates a sectional view through a further embodiment of a light conductor according to the invention, wherein a plurality of individual conductors are combined in a common protective envelope.

FIG. 5 illustrates on a substantially enlarged scale an embodiment of the invention comprising a plurality of individual light conductors 20. By omitting a boundary line along the right-hand and lower edges of FIG. 5, it is intended to show that the combination of elements may be continued to any desirable degree, whereby the cross sectional areas of the individual light conductors 20 may be reduced to a minimum. Further, in the embodiment of FIG. 5 a common protective envelope 18 is provided for all the individual light conductors 20 of the combination, because it is not necessary to provide each individual conductor with its own protective envelope. In FIG. 5 it is illustrated that the securing points at the tips of the supporting ribs 17 may comprise several different connecting or securing elements. Thus, in the upper left-hand corner of FIG. 5 only one rib 17 is connected to the outer common envelope 18. In the next adjacent connecting point 9' two ribs 17 merge into the common envelope 18. In the center among four adjacent individual conductors 20 a junction 16 is formed by tips of four respective ribs 17. The embodiment of FIG. 5 may also be produced by simple extrusion techniques and of materials as mentioned above. The bundle arrangement of FIG. 5 is especially suitable for the transmission of images and symbols which have been divided into image points. Any point within the cross-section of the multiple conductor embodiment of FIG. 5 is in a prearranged position. Thus, there is no need for coordinating the input and output ends of individual cores because such coordination is automatically assured.

Figure 6:
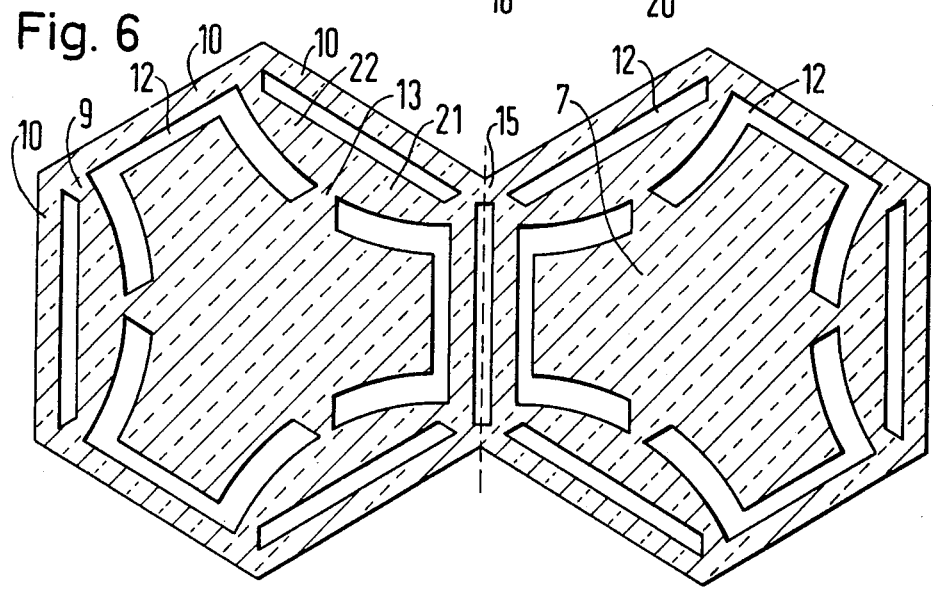
FIG. 6 is a further embodiment in which individual light conductors, each of which has its own protective envelope, are connected to each other in a severable manner.

FIG. 6 illustrates again on an enlarged scale a sectional view through a double light conductor according to the invention. The core 7 of each conductor is connected through tapering lands 13 to corresponding ribs 21, 22 which also taper toward their junction point with the envelope 10 which is provided individually for each conductor. Each land 13 in FIG. 6 is provided with two ribs 21, 22. All outer surfaces of the core 7, the lands 13 and the ribs 21, 22 are surrounded by hollow spaces 12, 12'. The outer shape of the envelope is hexagonal whereby a plurality of individually enveloped light conductors may be interconnected to form a conductor bundle. Such interconnection may be accomplished by bridging members 15 along which a severing may also be accomplished, if desired, since each light conductor core is provided with its own protective envelope 10. Light may be conducted in the arrangement according to FIG. 6 either in a concurrent or in a counter-current fashion. The possibility of severing at the bridges 15 has the advantage that the ends of the individual conductors may be connected to different points. In other words, the severing would in this instance only extend partially along the length of the conductor bundle. Here again, the configuration of the outer shape need not be hexagonal. Any shape suitable for the bundling may be employed in order to arrange three or more conductors in a bundle. Further, the production method and the materials used may be the same as described above.

The light conductor according to the invention may be manufactured in a very economical manner whereby such light conductors may be employed in areas where their use has been too expensive heretofore. Another advantage of the present conductors is seen in that these conductors may be produced with any desirable thickness. This is preferable as compared to the very thin optical fibers because as the light travels through a relatively thick light conductor, the number of reflections along the conductor walls is substantially reduced. Minimizing the number of reflections required to pass through the length of a light conductor increases the efficiency because even where total reflection takes place, a certain loss could not be avoided heretofore.

Further advantages of the invention are seen in that due to the integral structure of the core, the lands, the supporting ribs and the protective envelope, the present conductors may be produced in any desired length, especially where extrusion techniques are employed. Moreover, with this technique all elements may be made of the same material and the finished product directly emerges from the extrusion press. There is no need for inserting the conductor into a separate protective envelope because that envelope is produced simultaneously with the conductor proper.

The lands 13 should slso preferably taper away from the cores and toward the ribs in order to prevent that light beams may enter into the ribs along their longitudinal axis. In any event, and as illustrated, it is possible to secure a plurality of ribs to any individual land 13.

With regard to the embodiment of FIG. 4 it should be mentioned that the ordered or coordinated arrangement of the individual conductors is automatically assured by the extrusion process. Such coordinated arrangement of the elements is maintained automatically along the entire length of the multiple light conductor as it is being extruded. This feature avoids automatically the problems encountered in connection with light conductors comprising a plurality of optical fibers where a correlation of the input and output ends of the individual fibers must be assured by special cementing or bonding procedure. The invention avoids this problem automatically.

The arrangement of FIG. 6 has the advantage that the input and output ends of the interconnected individual conductors may be connected to respective individual pick-up and display points. This is, for example, desirable in connection with monitoring a plurality of lights located at spaced positions, for example, all the lights at the rear end of a car. Thus, eight individual conductors may be interconnected as shown in FIG. 6 and the input ends may be arranged to monitor the two brake lights, the two rear lights, the two blinker lights and the illumination of the license plate as well as the back-up light. The output end of such a conductor would then be arranged within the field of view of the driver, thus enabling a constant monitoring of the function of the just enumerated light sources.

Although the invention has been described with reference to specific example embodiments, it will be appreciated that it is intended to cover all modifications and equivalents within the scope of the appended claims.

What is claimed is:

1. A light conductor made of transparent optical material comprising integral core means, protective envelope means surrounding said integral core means, said integral core means having a uniform cross-section throughout its length, a plurality of supporting ribs, land means extending out of said core means and connecting said ribs to said core means, means securing said ribs to said protective envelope means, said ribs merging into said land means in such a manner that said core means, said ribs, and said land means are surrounded on all sides by hollow spaces, said ribs having walls tapering toward said securing means whereby a light beam entering into said supporting ribs through said land means from said core means is intercepted by said tapering walls of said supporting ribs which thus reflect said light beam back into said core means.

2. The light conductor according to claim 1, wherein said hollow spaces are filled with air.

3. The light conductor according to claim 1, wherein said core means, said land means, said supporting ribs, and said protective envelope means form an integral structure made of the same optical material.

4. The light conductor according to claim 1, wherein said land means taper toward said supporting ribs.

5. The light conductor according to claim 1, wherein the core means, the land means, the supporting ribs, and the envelope means are formed as an integral structure by extrusion techniques.

6. The light conductor according to claim 1, wherein said core means, said land means, and said supporting rib means have curved outer walls.

7. The light conductor according to claim 1, wherein said protective envelope means have outer shapes suitable for the interconnection of a plurality of individual conductors.

8. The light conductor according to claim 1, wherein said core means comprise a plurality of cores with their respective land means and supporting ribs, said protective envelope means comprising one envelope for each core, said light conductor further comprising bridging means joining adjacent envelopes to each other.

9. The light conductor according to claim 8, wherein said bridging means enclose hollow spaces facilitating the severing of adjacent envelopes.

10. The light conductor according to claim 1, wherein said core means comprise a plurality of cores, said protective envelope means comprising a common envelope for all cores, each core having its respective land means and supporting ribs, said securing means comprising first elements securing a rib to said common protective envelope, second elements securing at least two ribs to said common protective envelope, said light conductor further comprising interconnecting elements which join a plurality of ribs of adjacent cores to each other.

11. The light conductor according to claim 10, wherein said interconnecting elements form a junction between four ribs of four adjacent cores.

12. The light conductor according to claim 10, wherein each core, each land means, and each rib is bounded by hollow spaces along substantially the entire surface thereof.

* * * * *